Patented June 10, 1952

2,600,000

UNITED STATES PATENT OFFICE 2,600,000

MANUFACTURE OF SYMMETRICAL DIARYLHYDRAZINES

Jonas Kamlet, Easton, Conn., assignor to Mathieson Chemical Corporation, Baltimore, Md., a corporation of Virginia No Drawing. Application December 28, 1949, Serial No. 135,539

11 Claims. (Cl. 260—569)

This invention relates to an improved process for the manufacture of symmetrical diarylhydrazines. More particularly, it relates to an improved process for the manufacture of symmetrical compounds of the general formula R.NH.NH.R, where R is a member of the group consisting of phenyl, ortho-alkylphenyl, meta-alkylphenyl, ortho-alkoxyphenyl and meta-alkoxyphenyl. These compounds are of great practical importance in the manufacture of dyestuffs and pigments since they can readily be rearranged to form benzidine or substituted benzidines, which latter derivatives are the starting materials for the preparation of a wide and important series of tetrazo and polyazo compounds.

The purpose of the present invention is to provide a simple and inexpensive process for the manufacture of symmetrical diarylhydrazines from the corresponding aromatic nitro compounds as starting materials, employing cheap and readily available reagents. Another purpose of the present invention is to provide a cyclic process for the manufacture of symmetrical diarylhydrazines by the reduction of the corresponding aromatic nitro compounds with metallic sodium or sodium amalgam, wherein the amount of sodium or sodium amalgam employed for such reduction is markedly lower than has been feasible by any process heretofore described. Another purpose of the present invention is to provide a cyclic process for the manufacture of symmetrical diarylhydrazines wherein the reduction of the aromatic nitro compound is effected in two steps and in such a manner that the by-products of one step may serve as reducing agents in the other step, thereby effecting a very marked and significant economy in the consumption of the primary reducing agent, viz. sodium or sodium amalgam. Other and ancillary purposes of the present invention will become evident in the course of my description thereof.

A number of processes have heretofore been proposed for the manufacture of symmetrical diarylhydrazines:

(a) By the reduction of aromatic nitro compounds in alkaline alcoholic solution with zinc dust or spongy zinc (Teichman, Zeitschr. angew. Chem., 6, 67 (1893); Erdmann, Zeitschr. angew. Chem. 6, 163 (1893); Griesheim, German Patent 288,413);

(b) By the reduction of aromatic nitro, azoxy or azo compounds with finely divided iron in alkaline solution or suspension (Teer Meet, German Patent 138,496; Gerresheim, U. S. Patent 691,132);

(c) By the electrolytic reduction of aromatic nitro, azoxy or azo compounds (Lob, German Patents 116,467 and 122,046; Berichte 33, 2329 (1900); Wolfing, German Patent 100,234; Diefenbach and Moldenhauer, German Patent 264,013); Bayer, German Patents 121,899; 121,900; Darmstadter, German Patents 181,116, 189,312 and 196,979; Ciba, German Patent 297,019; Brunner, British Patent 147,541; Straub, German Patent 264,013); Bayer, German Patents 121,899; 121,900; ent 79,731);

(d) By the reduction of aromatic nitro, azoxy or azo compounds with molecular hydrogen in the presence of catalysts (Sabatier and Senderens, Comptes rendus 133, 323 (1901); Brown and Henke, U. S. Patent 1,451,489);

(e) By the reduction of aromatic nitro or azoxy compounds with sodium amalgam (Alexeyev, Zeitschr. für Chemie 1867, 33–34; Motschanovski, Journ. Russian Phys.-Chem. Soc., 14, 225 (1882); Hallie, U. S. Patent 2,486,358; Poma and Pellegrini, Giorn. Chim. Ind. Applic., 3, 409; German Patent 410,180);

By a variety of combinations of the above processes, and by a number of other and less important processes.

Liquid sodium amalgam, obtained from the mercury cathode electrolytic caustic-chlorine cells, as a reducing agent for the manufacture of hydrazobenzene, o,o'-hydrozotoluene, o,o'-hydrazoanisole, etc., has been used industrially since 1924 by the Bonelli plant in Cesano Maderno, Italy. However, this reduction is effected with amalgam containing about 0.07% of sodium and huge quantities of mercury must be circulated to obtain a relatively small amount of the symmetrical diarylhydrazines. Higher sodium concentrations in the amalgam diminish its fluidity and ease of circulation.

In British Patents 200,167 and 203,059, sodium amalgam is used as a reducing agent and is fed into the reactor countercurrent to the solution or emulsion to be reduced, or the reagents are vigorously agitated together to effect such reduction. However, the output capacity of such reactors is necessarily very low due to the fact that it is not feasible to work with amalgams containing much more than 0.4% of sodium, 0.1% to 0.2% being the usual working concentrations of sodium in the amalgam. Due to the low reaction velocity of dilute sodium amalgam with aromatic azoxy and azo compounds (i. e. the advanced stages of the nitro compound reduction process), complete conversion to the symmetrical diarylhydrazine often requires an inordinately long reaction time (12–13 hours) while a considerable excess of sodium amalgam (up to 80% excess) must often be used.

Thus, whereas the theoretical equation for this reduction:

$$2RNO_2 + 10Na + 6H_2O \rightarrow R.NH.NH.R + 10NaOH$$

requires the consumption of ten gram-atoms of sodium per gram-mole of symmetrical diarylhydrazine, in practice as much as eighteen gram-atoms of sodium is required and that in the form of a 0.07%–0.2% amalgam. It is the purpose of the present invention to provide a process for the reduction of aromatic nitro compounds to the corresponding symmetrical diarylhydrazines with an overall consumption of metallic sodium not much in excess of four gram-atoms per gram-mole of diarylhydrazine.

The basis of the present invention is a cyclic, two-step process which can best be understood by a detailed description of each step individually. Because of the cyclic nature of said process, either step may be considered as the first and the other step considered as the second.

STEP 1

The starting material for the process is an aromatic nitro compound such as nitrobenzene, o-nitrotoluene, m-nitrotoluene, o-nitroanisole, o-nitrophenetole, et cetera.

The aromatic nitro compound (2.0 moles) is reacted with a mixture of sodium methylate and sodium hydroxide containing at least 1.5 moles of sodium methylate, and preferably about 3.0 moles. The sodium methylate, under these conditions, acts as a reducing agent and converts the aromatic nitro compound quantitatively to the corresponding aromatic azoxy compound, being itself oxidized to sodium formate, according to the equation:

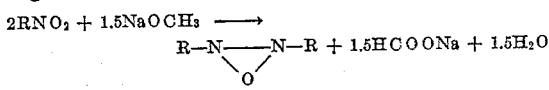

In the presence of more than 1.5 moles of sodium methylate, the water formed by this reaction will react with the excess of sodium methylate, according to the reaction:

$$1.5NaOCH_3 + 1.5H_2O \rightarrow 1.5aOH + 1.5CH_3OH$$

so that the overall reaction may be written:

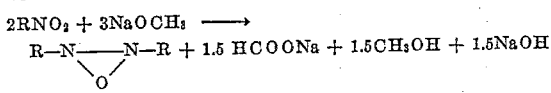

At the conclusion of this reaction, the aromatic azoxy compound is separated from the concomitant mixture of sodium formate and sodium hydroxide.

STEP 2

The aromatic azoxy compound obtained in Step 1 is now reduced, in the presence of methanol, with a member of the group consisting of metallic sodium and sodium amalgam, wherein the following reaction occurs:

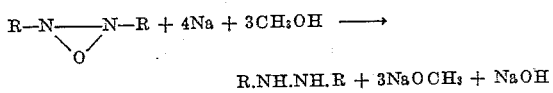

The resultant symmetrical diarylhydrazine, which is the desired end-product of the process, is now separated from the concomitant mixture of sodium methylate and sodium hydroxide under conditions which do not cause the decomposition of the sodium methylate. This separated mixture of sodium methylate and sodium hydroxide is now recycled to the process and is used in Step 1, as described above, as the reducing agent for the conversion of the aromatic nitro compound to the aromatic azoxy compound.

Thus, taking the equations for each step:

Step 2

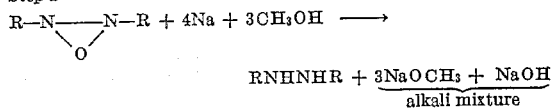

Step 1

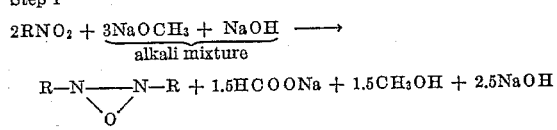

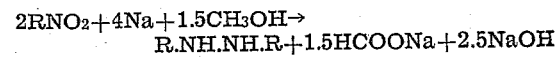

and combining these, the overall equation for the process of the present invention becomes:

$$2RNO_2 + 4Na + 1.5CH_3OH \rightarrow$$
$$R.NH.NH.R + 1.5HCOONa + 2.5NaOH$$

Thus, it will be seen that this process requires a theoretical consumption of only four gram-atoms of sodium per gram-mole of symmetrical diarylhydrazine, whereas the process of the prior art required a theoretical consumption of ten gram-atoms of sodium and, in practice when employing dilute sodium amalgam as a reducing agent, an actual consumption of eighteen gram-atoms of sodium per gram-mole of diarylhydrazine (Hallie, U. S. Patent 2,486,358).

The reduction of the aromatic nitro compound with the mixture of sodium methylate and sodium hydroxide is effected quite readily by heating the reagents in the proportions above indicated, in the presence of excess anhydrous, acetone-free methanol or a lower aliphatic alcohol as a mutual solvent, or in the presence of an inert diluent, such as benzene, toluene or xylene. Thus, by refluxing nitrobenzene (2 moles) with a mixture of 3 moles of sodium methylate and 1 mole of sodium hydroxide dissolved in acetone-free, anhydrous methanol as a mutual solvent at atmospheric pressure for three to six hours, a quantitative yield of azoxybenzene is obtained (Klinger, Berichte 15, 865–867 (1882); ibid, 15, 941–946 (1882); Claus, Berichte 5, 364–365 (1872); Fry and Cameron, Journ. Amer. Chem. Soc., 49, 864–873 (1927); Suter and Dains, Journ. Amer. Chem. Soc., 50, 2733–2739 (1928; Fry and Bowman, Journ. Amer. Chem. Soc., 52, 1531–1536 (1930). The presence of free sodium hydroxide in admixture with the sodium methylate in no way detracts from the reducing potential of the mixture since caustic soda in absolute methanol is also a powerful reducing agent and will convert nitrobenzene to azoxybenzene (Mitscherlich, Annalen, 12, 311 (1834); Lachman, Journ. Amer. Chem. Soc., 24, 1180–1181 (1902).

The reaction time may also be diminished very considerably by effecting the reaction of the aromatic nitro compound with the sodium methylate-sodium hydroxide mixture at advanced temperatures and at superatmospheric pressures.

The reaction may also be effected in the presence of an inert diluent, such as benzene, toluene or xylene, in which the aromatic nitro-compound is soluble and the NaOCH₃—NaOH mixture is insoluble. Thus, by refluxing a xylene solution of 2 moles of nitrobenzene with a mixture of 3 moles of NaOCH₃ and 1 mole of NaOH for eight hours at atmospheric pressure, a substantially quantitative yield of azoxybenzene is obtained (Bruhl, Berichte 37, 2076 (1904).

The conclusion of this step of the process may be ascertained by isolating a sample of the brownish-red end-product and determining that the melting-point thereof corresponds with the known melting-point of the desired aromatic azoxy compound.

At the conclusion of the reduction, the solvent (e. g. methanol, lower aliphatic alcohol, benzene, toluene, xylene, etc.) is distilled off and the residue of aromatic azoxy compound separated from the concomitant sodium formate and sodium formate and sodium hydroxide by one of the following methods:

(a) By filtering off the insoluble

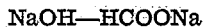
NaOH—HCOONa mixture from the liquid azoxy compound above the melting-point of the latter (m. pt. azoxybenzene—35°36° C., m. pt. o,o'-azoxytoluene—59°-60° C., etc.), or (b) Adding a solvent for the NaOH—HCOONa which is a non-solvent for the azoxy compound, such as water, and separating the solution from the insoluble azoxy compound, or (c) By adding a non-solvent for the

NaOH—HCOONa mixture which is a solvent for the azoxy compound (such as benzene, toluene, xylene, petroleum ether, gasoline, etc.) and separating the solution of the azoxy compound from the insoluble residue of sodium hydroxide and sodium formate. Said solution is then transferred to the second step reactor, the solvent distilled off and recovered for re-use, and the azoxybenzene processed further as described below.

The yields obtainable by reducing aromatic nitro compounds with sodium methylate-sodium hydroxide mixtures, as above described, are substantially quantitative. The by-product mixture of sodium formate and sodium hydroxide recovered during this stage, either as a solution or in solid form, represents a valuable by-product of this process.

The second step of the process is effected by dissolving the azoxy compound (obtained in the first step) in anhydrous, acetone-free methanol, or in an inert hydrocarbon solvent (such as benzene, toluene, xylene, petroleum hydrocarbons, etc.) containing at least three moles of methanol per mole of azoxy compound, in a suitable reactor, preferably fitted with a reflux condenser and an adequate agitator.

It is obvious that if the first step is effected by reducing the aromatic nitro compound with sodium methylate-sodium hydroxide in the presence of an inert aromatic or petroleum hydrocarbon diluent, and the sodium formate-sodium hydroxide formed is filtered off, the resultant solution of the aromatic azoxy compound, admixed with sufficient methanol, may then be used directly in the second step of the process, for reduction to the symmetrical diarylhydrazine.

Sodium metal is now added to the well-agitated solution, in small portions or in a slow continuous stream, in any convenient form such as sodium pellets, sodium wire, sodium globules, sodium briquettes, etc. However, by far the preferred method of introducing sodium into the reaction mixture is in the form of a stable dispersion in a hydrocarbon (such as that described by Tanner in U. S. Patent 2,409,519 and by Hansley in U. S. Patents 2,394,608, 2,487,333 and 2,487,334) in which the sodium metal is subdivided to a particle size of one to five microns.

The temperature at which the reduction of the azoxy compound with the sodium is effected may be as low as 20° C., but proceeds more satisfactorily above 60° C., and is preferably maintained near the refluxing temperature of the solvent. The sodium (e. g. as sodium dispersion) is added at such a rate as to keep the reaction mixture refluxing gently.

When the azoxy compound is completely reduced to the corresponding symmetrical diarylhydrazine, the conclusion of the reaction is indicated by the disappearance of the reddish color of the intermediate azo compound.

During this reduction, a competitive reaction may occur, i. e. the reaction of the sodium with the methanol to form sodium methylate with the liberation of molecular hydrogen, so that the sodium consumption may rise to 4.4–4.6 gram-atoms per gram-mole of aromatic azoxy compound reduced (due to sodium loss in said competitive reaction). This competitive reaction may be minimized by intense agitation of the azoxy compound solution and the sodium dispersion and by avoiding temporary or localized excessive addition or accumulation of the sodium metal. However, it will be seen that the by-product NaOCH₃—NaOH mixture of this step of the process will contain at least 3.0 moles of sodium methylate (per mole of azoxy compound reduced) and may contain more than 3.0 moles due to said side-reaction of the sodium and the methanol.

This step may also be effected by the use of sodium amalgam obtained from a mercury cathode electrolytic caustic-chlorine cell, or by dissolving metallic sodium in dry mercury, or by the methods described in the above-cited British Patents 200,167 and 203,059, German Patent 410,180 or U. S. Patent 2,486,358. Alternatively, this step may be effected in the cathode chamber of a mercury cathode electrolytic cell, the catholyte consisting of a methanol solution of the aromatic azoxy compound and arrangement being made for adequate mixing of the circulating amalgam (i. e. the mercury cathode) and the catholyte. Since the azoxy compound is already 60% reduced (from the nitro stage to the hydrazo stage), the use of sodium amalgam as a reducing agent for the second step of the process of this invention, would involve the preparation and circulation of markedly less amalgam and mercury than do any of the processes of the prior art.

At the conclusion of the reduction of the azoxy compound to the symmetrical diarylhydrazine, the excess solvent is distilled off and the end-product diarylhydrazine is separated from the concomitant sodium methylate-sodium hydroxide mixture by any suitable method which will not decompose the sodium methylate, and preferably by adding a solvent for the diarylhydrazine which is a non-solvent for the NaOCH₃—NaOH mixture (such as benzene, toluene, xylene, petroleum hydrocarbons, etc.) and filtering off the diarylhydrazine solution from the insoluble sodium methylate-sodium hydroxide residue. The sodium methylate-sodium hydroxide residue is protected from decomposition by exposure to the carbon dioxide and moisture of the air and is returned to be used in Step 1 of the process. In distilling off methanol from the reduced mixture of diarylhydrazine, NaOCH₃ and NaOH, it is usually not possible to remove the last traces of the solvent since some will remain behind associated with the sodium methylate as methanol of solvation.

This retention will in no way interfere with the recovery and subsequent re-use of the sodium methylate in the first step of the process.

Again, it is obvious that if the reduction of the azoxy compound is effected in an aromatic or petroleum hydrocarbon solvent in the presence of a minor amount of methanol, the end-product will consist of a solution of the symmetrical diarylhydrazine in the hydrocarbon solvent, and an insoluble suspension of the sodium methylate-sodium hydroxide by-product, which latter insoluble mixture may be removed by filtration and returned to Step 1 of the process.

The solution of symmetrical diarylhydrazine is now distilled to recover the solvent for re-use and to obtain the end-product in a convenient crystalline form. It is also feasible to convert the solution of diarylhydrazine in hydrocarbon solvent directly to the corresponding benzidine or substituted benzidine hydrochlorides, as described by Nelson in U. S. Patent 1,633,123, by rearranging the diarylhydrazine solution in the presence of aqueous hydrochloric acid and separating the solvent from the resultant insoluble paste of benzidine salt.

The following example is given to define and to illustrate the present invention, but in no way to limit it to reagents, proportions or conditions described therein. Obvious improvements will occur to any person skilled in the art. All parts given are parts by weight.

*Example*

Step 1.—250 parts of nitrobenzene (2.0 moles) and a mixture of 162 parts of sodium methylate (3.0 moles) and 40 parts of sodium hydroxide (1.0 mole) dissolved in 2000 parts of anhydrous, acetone-free methanol, are boiled under reflux for six hours. The methanol is then distilled off and the liquid azoxybenzene is filtered, with pressure, while still hot, from the insoluble by-product containing sodium formate and sodium hydroxide. The filter-cake is washed with a little methanol and the filtrate (i. e. the azoxybenzene) and the washings combined and transferred to the second step reactor.

Step 2.—The azoxybenzene from the first step (198 parts) is diluted to 2000 parts with anhydrous, acetone-free methanol and reduced with vigorous agitation, at the reflux temperature, by the gradual addition of 92 to 104 parts of sodium (as a fine dispersion in toluene containing 40% of sodium). The sodium dispersion is added at such a rate as to keep the reaction mixture at the reflux temperature. When the solution is decolorized and the reduction to hydrazobenzene is complete, the methanol is distilled off, 1800 parts of toluene is added and the reaction mixture stirred until the hydrazobenzene is comcompletely dissolved. The solution of hydrazobenzene in toluene is rapidly filtered off from the residual mixture of sodium methylate and sodium hydroxide. Said residual mixture containing at least 162 parts of sodium methylate and 40 parts of sodium hydroxide is returned to the process and used as described above in Step 1 for the reduction of nitrobenzene to azoxybenzene.

The toluene solution of hydrazobenzene is distilled to recover the toluene and obtain a yield of 175 parts of hydrazobenzene, m. pt. 120°–122° C., equivalent to 95% of the theoretical.

In a similar manner:

(a) o-Nitrotoluene is reduced to o,o'-azoxytoluene (m. pt. 59°–60° C.) with NaOCH₃—NaOH (Klinger and Pitschke, Berichte 18, 2554 (1885) and the latter reduced to o,o'-hydrazotoluene (m. pt. 161°–162° C.) with sodium, with the regeneration of the NaOCH₃—NaOH.

(b) m-Nitrotoluene is reduced to oily m,m'-azoxytoluene with NaOCH₃—NaOH (Starke, Journ. prakt. Chem., (2) 59, 206 (1899) and the latter reduced to m,m'-hydrazotoluene (m. pt. 37°–39° C.) with sodium, with the regeneration of the NaOCH₃—NaOH.

(c) o-Nitroanisole is reduced to o,o'-azoxyanisole (m. pt. 81° C.) with NaOCH₃—NaOH (Buchka and Schachterbeck, Berichte, 22, 835 (1889) and the latter reduced to o,o'-hydrazoanisole (m. pt. 102° C.) with sodium, with the regeneration of the NaOCH₃—NaOH.

(d) o-Nitrophenetole is reduced to o,o'-azoxyphenetole (m. pt. 102° C.) with NaOCH₃—NaOH (Gattermann and Ritschke, Berichte, 23, 1738, 1744 (1890) and the latter reduced to o,o'-hydrazophenetole (m. pt. 89° C.) with sodium, with the regeneration of the NaOCH₃—NaOH, et cetera, et cetera. The reaction of sodium methylate with o-nitrochlorobenzene results in too many by-products to make this process suitable for the preparation of o,o'-dichlorohydrazobenzene (for the manufacture of 3,3'-dichlorbenzidine).

It will be noted that a by-product of at least 2.5 moles of caustic soda and 1.5 moles of sodium formate is obtained by this process per mole of symmetrical diarylhydrazine produced. This by-product can be utilized in a number of ways, as for example:

(a) In a sodium formate plant. The mixture of caustic soda and sodium formate can be treated with carbon monoxide under pressure and converted completely to sodium formate. (Ann. Chim. 3, 61, 463 (1855); Chem. Zntrlbl. 1924I, 2096, Berichte 13, 23 (1880); German Patents 86,419, 179,515 and 209,417);

(b) To prepare benzidine base from the symmetrical diarylhydrazine. A typical example of such a preparation may be given as follows:

184 parts of hydrazobenzene (1 mole) is mixed with 240 parts of 30% hydrochloric acid (2 moles) (which should be free of sulfate ions) and 200 parts of ice for five hours, and then is slowly heated in the course of one hour to 80° C. Now cool to 60° C., filter from a small amount of azobenzene which forms (and which may be mixed with the next batch of azoxybenzene for reduction to hydrazobenzene with sodium), and add 110 parts of 66° Bé. sulfuric acid (1 mole). The copious precipitate of benzidine sulfate which forms is filtered off, and washed with 0.5% sulfuric acid solution. The benzidine sulfate filter-cake is now slurried with 800 parts of water and alkalinized by the addition of a quantity of the caustic soda-sodium formate by-product containing 80 parts of NaOH (2 moles). The precipitated benzidine is filtered off, washed and dried and may be further purified by distillation under reduced pressure. The yield of benzidine (m. pt. 127°–128° C., b. pt.$_{15mm}$–240° C.) is 160 parts, equivalent to 87% of theory, based on the hydrazobenzene.

By neutralizing the filtrate from the benzidine sulfate precipitate with alkali, 16 parts of diphenylin (o,p'-diaminodiphenyl) (m. pt. 45° C.) may be recovered as a by-product.

Having described my invention, what I claim and desire to protect by Letters Patent is:

1. A process for the manufacture of symmetrical diarylhydrazines which comprises the steps of: (a) reacting an aromatic nitro compound chosen from the group consisting of nitrobenzene, ortho- and meta-nitrotoluene, ortho- and meta-nitroanisole, ortho- and meta-nitrophenetole with a mixture of sodium methylate and sodium hydroxide and separating the resultant aromatic azoxy compound from the concomitant sodium compounds, and (b) reducing the aromatic azoxy compound obtained in step (a) with a member of the group consisting of sodium and sodium amalgam in the presence of methanol, separating the resultant symmetrical diarylhydrazine from the concomitant mixture of sodium methylate and sodium hydroxide, and returning said mixture of sodium methylate and sodium hydroxide to the first step of the process for reducing the aromatic nitro compound to the azoxy compound.

2. A process for the manufacture of symmetrical diarylhydrazines of the general formula R.NH.NH.R, where R is a member of the group consisting of phenyl, ortho- and metal-methylphenyl, ortho- and meta-methoxyphenyl, ortho- and meta-methoxyphenyl, which comprises the steps of: (a) reacting a compound of the general formula $RNO_2$ with a mixture of sodium methylate and sodium hydroxide and separating the resultant compound of formula

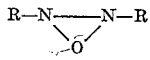

from the concomitant sodium compounds, and (b) reducing the compound of formula

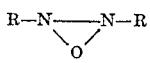

obtained in step (a) with a member of the group consisting of sodium and sodium amalgam in the presence of methanol, separating the resultant symmetrical diarylhydrazine of formula R.NH.NH.R from the concomitant mixture of sodium methylate and sodium hydroxide, and returning said mixture of sodium methylate and sodium hydroxide to the first step of the process for reducing the $RNO_2$ to the

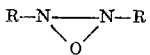

3. A process for the manufacture of symmetrical diarylhydrazines which comprises the steps of: (a) reacting two moles of an aromatic nitro compound chosen from the group consisting of nitrobenzene, ortho- and meta-nitrotoluene, ortho- and meta-nitroanisole, ortho- and meta-nitrophenetole with a mixture of sodium methylate and sodium hydroxide containing at least 1.5 moles of sodium methylate, and separating the resultant aromatic azoxy compound from the concomitant sodium compounds, and (b) reducing the aromatic azoxy compound obtained in step (a) with a member of the group consisting of metallic sodium and sodium amalgam, in quantity equivalent to at least four atoms of sodium, in the presence of at least three moles of methanol, separating the resultant symmetrical diarylhydrazine from the concomitant mixture of sodium methylate and sodium hydroxide, and returning a sufficient quantity of said mixture of sodium methylate and sodium hydroxide to the first step of the process, to provide at least 1.5 moles of sodium methylate for reducing the aromatic nitro compound to the azoxy compound.

4. The process of claim 1, where the aromatic nitro compound is nitrobenzene.

5. The process of claim 1, where the aromatic nitro compound is ortho-nitrotoluene.

6. The process of claim 1, where the aromatic nitro compound is meta-nitrotoluene.

7. The process of claim 1, where the aromatic nitro compound is ortho-nitroanisole.

8. The process of claim 1, where the aromatic nitro compound is ortho-nitrophenetole.

9. In a process for the manufacture of symmetrical diarylhydrazines, the step which comprises reducing an aromatic azoxy compound chosen from the group consisting of azoxybenzene, azoxy-ortho-toluene, azoxy-meta-toluene, azoxy-ortho-anisole, azoxy-meta-anisole, azoxy-ortho-phenetole and, azoxy-meta-phenetole with a member of the group consisting of sodium and sodium amalgam in the presence of methanol and separating the resultant diarylhydrazine from the concomitant mixture of sodium methylate and sodium hydroxide.

10. The process of claim 3 where two moles of an aromatic nitro compound chosen from the group consisting of nitrobenzene, ortho- and meta-nitrotoluene, ortho- and meta-nitroanisole, ortho- and meta-nitrophenetole are reacted with a mixture of sodium methylate and sodium hydroxide containing three moles of sodium methylate.

11. The process of claim 1 where the reducing agent in step (b) is a dispersion of metallic sodium in an inert hydrocarbon.

JONAS KAMLET.

REFERENCES CITED

The following references are of record in the file of this patent:

Alexejew: "Zeitschrift für Chemie" (1867), pp. 33–35.

Claus: "Ber. Deut. Chem.," vol. 5 (1872), pp. 364–365.

Klinger: "Ber. Deut. Chem.," vol. 15 (1882), pp. 865–866.

Klinger et al.: "Ber. Deut. Chem.," vol. 16 (1883), pp. 941 and 942.

Klinger et al.: "Ber. Deut. Chem.," vol. 18 (1885), pp. 2551–2554.

Lachman: "J. Am. Chem. Soc.," vol. 24 (1902), pp. 1179–1181.

Fry et al.: "J. Am. Chem. Soc.," vol. 49 (1927), pp. 864–871.

Suter et al.: "J. Am. Chem. Soc.," vol. 50 (1928), pp. 2734–2735.